(12) United States Patent
McCarthy et al.

(10) Patent No.: US 8,151,314 B2
(45) Date of Patent: Apr. 3, 2012

(54) SYSTEM AND METHOD FOR PROVIDING MOBILE TRAFFIC INFORMATION IN AN INTERNET PROTOCOL SYSTEM

(75) Inventors: Mary McCarthy, San Antonio, TX (US); Robert Coldwell, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 663 days.

(21) Appl. No.: 12/164,727

(22) Filed: Jun. 30, 2008

(65) Prior Publication Data

US 2009/0328116 A1    Dec. 31, 2009

(51) Int. Cl.
| | |
|---|---|
| H04N 7/173 | (2011.01) |
| H04N 7/16 | (2011.01) |
| G08G 1/00 | (2006.01) |
| G06F 15/16 | (2006.01) |
| H04H 40/00 | (2008.01) |
| G01C 21/00 | (2006.01) |

(52) U.S. Cl. ............... 725/131; 725/93; 725/91; 725/62; 725/100; 725/109; 701/117; 701/118; 701/119; 701/202; 709/231; 455/3.06

(58) Field of Classification Search .................. 725/131, 725/93, 91, 62, 100, 109; 701/117, 118, 701/119, 202; 709/231; 455/3.06
See application file for complete search history.

(56) References Cited

U.S. PATENT DOCUMENTS

| | | | |
|---|---|---|---|
| 5,396,429 A | 3/1995 | Hanchett | |
| 5,982,298 A | 11/1999 | Lappenbusch et al. | |
| 6,297,748 B1 * | 10/2001 | Lappenbusch et al. | 340/905 |
| 6,728,628 B2 * | 4/2004 | Peterson | 701/117 |
| 6,775,614 B2 | 8/2004 | Kim | |
| 6,922,629 B2 | 7/2005 | Yoshikawa et al. | |
| 6,944,538 B2 | 9/2005 | Ishibashi et al. | |
| 7,069,143 B2 | 6/2006 | Peterson | |
| 7,197,320 B2 | 3/2007 | Joseph | |
| 2007/0005795 A1 | 1/2007 | Gonzalez | |
| 2007/0067104 A1 | 3/2007 | Mays | |
| 2007/0112939 A1 * | 5/2007 | Wilson et al. | 709/219 |
| 2007/0118281 A1 * | 5/2007 | Adam et al. | 701/211 |
| 2008/0077596 A1 | 3/2008 | Patton et al. | |

OTHER PUBLICATIONS

"TrafficLand," Consumer Website, TrafficLand, Inc., May 14, 2008, http://corporate.trafficland.com/services/consumer.html.

* cited by examiner

*Primary Examiner* — Hoang-Vu A Nguyen-Ba
(74) *Attorney, Agent, or Firm* — Guntin Meles & Gust, PLC; Pablo Meles

(57) ABSTRACT

A system comprises a server operable to deliver an Internet Protocol Television stream to a set-top box, and operable to retrieve an image from a first traffic camera. Upon receipt of a request from the set-top box, the image is sent to a wireless device.

20 Claims, 8 Drawing Sheets

SYSTEM AND METHOD FOR PROVIDING MOBILE TRAFFIC INFORMATION IN AN INTERNET PROTOCOL SYSTEM

FIELD OF THE DISCLOSURE

The present disclosure generally relates to communication networks and, more particularly relates to travel route planning and information display on a communication network.

BACKGROUND

Traffic cameras are employed by transportation authorities to obtain real-time images from various locations, such as high traffic intersections and freeway interchanges. As a service, the transportation authorities often make these images available to local news outlets and over the Internet.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
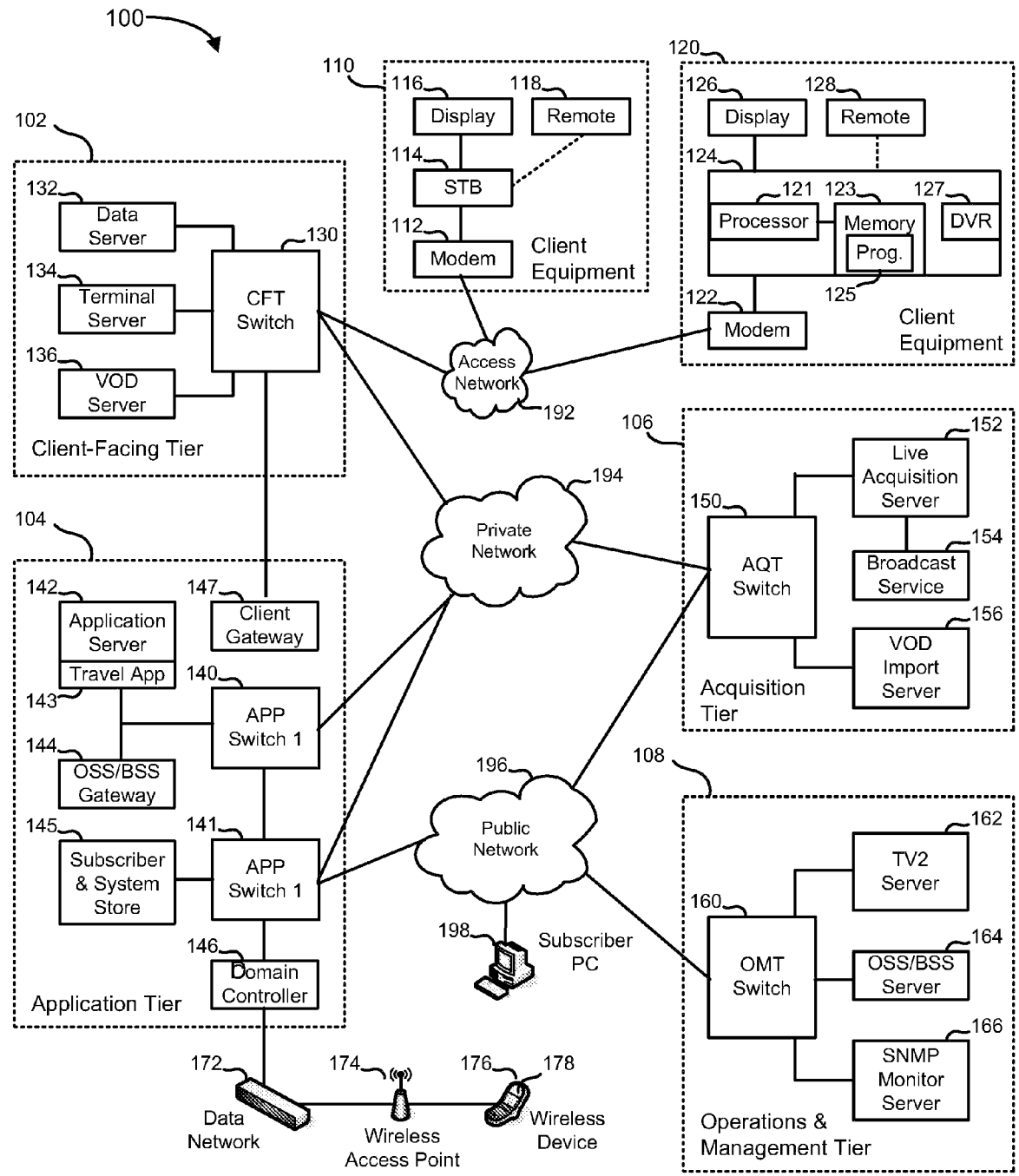
FIG. 1 is a block diagram illustrating an Internet Protocol Television system.

FIG. 1 shows an embodiment of an Internet protocol television (IPTV) system 100 including a client facing (CF) tier 102, an application tier 104, an acquisition tier 106, an operations and management (OM) tier 108, a first set of client equipment 110, and one or more additional sets of client equipment, generally designated as an $n^{th}$ set of client equipment 120. The client equipment 110 and 120 is typically located at the home or business premises of a subscriber to the IPTV system 100. The IPTV system 100 includes an access network 192, a private network 194, and a public network 196. Each tier 102, 104, 106, and 108 is coupled to one or more of the access network 192, the private network 194, and the public network 196. In an embodiment, the CF tier 102 is coupled to the access network 192 and the private network 194, the application tier 104 is coupled to the private network 194 and to the public network 196, the acquisition tier 106 is coupled to the private network 194 and to the public network 196, and the OM tier 108 is coupled to the public network 196. The client equipment 110 and 120 are coupled to the access network 192.

The networks 192, 194, and 196 communicate information between the tiers 102, 104, 106, and 108, and the client equipment 110 and 120. The access network 192 communicates information between the CF tier 102 and the client equipment 110 and 120. The private network 194 communicates information between the CF tier 102 and the application tier 104, between the application tier 104 and the acquisition tier 106, and between the acquisition tier 106 and the CF tier 102. The public network 196 communicates information between the application tier 104 and the acquisition tier 106, between the acquisition tier 106 and the OM tier 108, and between the OM tier 108 and the application tier 104. Information is also communicated directly between the CF tier 102 and the application tier 104, as described below.

The client equipment 110 includes a modem 112, a set-top box 114, a display 116, and a remote control 118. Likewise, the client equipment 120 includes a modem 122, a set-top box 124, a display 126, and a remote control 128. The display devices 116 and 126 can include a television, a computer monitor and speakers, another display device, or any combination thereof. A non-limiting example of a remote control 118 or 128 includes a hand-held controller device, a game controller device, a keyboard/mouse device, another control device, or any combination thereof.

The modems 112 and 122 are coupled to the access network 192. In a non-limiting example, the modems 112 and 122 are coupled to the access network 192 via a fiber-optic network, a digital subscriber line (DSL), another network fabric, or any combination thereof. The modems 112 and 122 translate information from a form suitable for transmission over the access network 192 to a form suitable for use by the set-top boxes 114 and 124, and vice versa. The CF tier 102 can communicate with a multiple sets of client equipment 110 and 120 over a wide geographic area, such as a regional area, a metropolitan area, a viewing area, or any other suitable geographic area that can be supported by the access network 192.

The information that the CF tier 102 communicates to the modem 112 is sent to the set-top box 114, which processes the information into a form suitable for display by the display device 116 for viewing by the subscriber. Likewise, the information that the CF tier 102 communicates to the modem 122 is sent to the set-top box 124, which processes the information display by the display device 126. The set-top boxes 114 and 124 can receive audio/video information from the CF tier 102, and render or display the audio/video information on the display devices 116 or 126. The set-top boxes 114 and 124 can thus include tuners that receive and decode television programming information.

The set-top boxes 114 and 124 can also receive data from the CF tier 102, and render or display the data on the display device 116 or 126. Further, the set-top box devices 114 and 124 can send data to the CF tier 102. Such data can include service requests, or commands from the subscriber, received by the set-top boxes 112 and 122 via the remote controls 118 and 128. In this way, the subscriber can request services or information or respond to a request for information from the IPTV system 100. As such, the set-top box 124 is further illustrated as including a processor 121, a memory device 123 that is accessible to the processor, and a video content storage module 127 such as a digital video recorder (DVR). The memory device 123 includes a set-top box program 125. The set-top box program 125 contains instructions that can be executed by the processor 121 to control the data flow between the subscriber and the IPTV system 100. The set-top box program 125 can include an IPTV software platform such as Microsoft® TV IPTV Edition.

The set-top box program 125 can facilitate the management of data communications between the set-top box 124 and the IPTV system 100. For example, the set-top box program 125 can include a procedure whereby the set-top box 124 receives a request to record a television program on the video content storage module 127, or sends a status to the IPTV system 100 that the television program has been recorded. Likewise, the set-top box program 125 can include a procedure whereby the subscriber can interact with the IPTV system 100 to receive and execute a viewing preference that the subscriber has created in the IPTV system 100. Such preferences can be created via the remote control 128, or through a subscriber account that is accessible through the public network 196, such as through a subscriber's personal computer 198.

The CF tier 102 includes a client-facing tier (CFT) switch 130, a data server 132, a terminal server 134, and a video-on-demand (VoD) server 136. The CFT switch 130 manages communication with the client equipment 110 and 120 through the access network 192 and with the application tier 104 and the acquisition tier 106 through the private network 194. The CFT switch 130 is coupled to the data servers 132 that store data transmitted in response to subscriber requests. The CFT switch 130 is also coupled to the terminal servers 134 that provide terminal devices, such as, a game application server, or other devices with a common connection point to the private network 194. The CFT switch 130 is also coupled to the VoD server 136.

The application tier 104 includes a first application tier (APP) switch 140, a second APP switch 141, an application server 142, an operation systems and support/billing systems and support (OSS/BSS) server 144, a domain controller 146, a subscriber and system store 145, and a client gateway 147. The APP switches 140 and 141 manage communication with the CF tier 102 and the acquisition tier 106 through the private network 194. The APP switch 141 also manages communication with the acquisition tier 106 and the OM tier 108 through the public network 196. The first APP switch 140 is coupled to the second APP switch 141. The first APP switch 140 is also coupled to the application server 142 and to the OSS/BSS gateway 144. The application server 142 provides applications to the set-top box devices 114 and 124, so the set-top box devices 114 and 124 can provide functions such as display, messaging, processing of IPTV data and VoD material. The OSS/BSS gateway 144 includes operation systems and support (OSS) data, and billing systems and support (BSS) data.

The second APP switch 141 is coupled to the domain controller 146 and to the subscriber and system store 145. The domain controller 146 provides web access, for example, to subscribers via the public network 196. The subscriber and system store 148 includes account information that is associated with subscribers who access the IPTV system 100 via the private network 194 or the public network 196. The application tier 104 can also communicate data directly to the CF tier 102 through the client gateway 147. In this embodiment, the client gateway 147 is coupled directly to the CFT switch 130.

The client gateway 147 provides subscriber access to the private network 194 and the tiers coupled thereto. In particular, the set-top boxes 114 and 124 can access the IPTV system 100 via the access network 192 using information received from the client gateway 147. The access network 192 provides security for the private network 194. The client equipment 110 and 120 access the client gateway 147 via the access network 192, and the client gateway 147 allows the client equipment 110 and 120 to access the private network 194 once the client equipment 110 and 120 is authenticated or verified. Similarly, the client gateway 147 prevents unauthorized client equipment (not illustrated), such as hacker computers or stolen set-top box devices, from accessing the private network 194 by denying access to these devices beyond the access network 192.

For example, when the set-top box device 114 accesses the system 100 via the access network 192, the client gateway 147 verifies subscriber information by communicating with the subscriber and system store 145 via the private network 194, the first APP switch 140, and the second APP switch 141. Further, the client gateway 147 verifies billing information and status by communicating with the OSS/BSS gateway 144 via the private network 194 and the first APP switch 140. The OSS/BSS gateway 144 transmits a query across the first APP switch 140, to the second APP switch 141, and the second APP switch 141 communicates the query across the public network 196 to an OSS/BSS server 164 (described below). After the client gateway 147 confirms subscriber and/or billing information, the client gateway 147 allows the set-top box device 114 access to IPTV system 100 content and VoD server 136 content. If the client gateway 147 cannot verify subscriber information for the set-top box 114, such as when the set-top box 114 is connected to a different twisted pair, or when the set-top box 114 is stolen, the client gateway 147 denies transmissions to and from the set-top box device 114 beyond the access network 192.

The domain controller 146 communicates with the public network 196 via the second APP switch 141. The domain controller can include a web portal that allows a subscriber to the IPTV system 100 to access the IPTV system 100 using a personal computer 198. The domain controller 146 also communicates with a data network 172 that is connected to a wireless access point 174. The wireless access point 174 communicates with a subscriber's wireless device 176 to provide wireless access to the IPTV system 100. A non-limiting example of a wireless device 176 includes a cellular telephone, a personal digital assistant, a mobile e-mail device, a portable digital video device, another wireless device, or any combination thereof. The wireless device 176 includes a display 178 for displaying information from the IPTV system 100. The display 178 can include a text display, a picture display, a video display or any combination thereof.

The acquisition tier 106 includes an acquisition tier (AQT) switch 150, a live acquisition server 152, a broadcast service 154, and a video-on-demand importer server 156. The AQT switch 150 manages communication with the CF tier 104 and the application tier 104 through the private network 194, and with the application tier 104 and the OM tier 108 through the public network 196. The AQT switch 150 is coupled to the live acquisition server 152, and the video-on-demand importer server 156. The live acquisition server 152 acquires television content from the broadcast service 154. The live acquisition server 152 can send the television content to the AQT switch 150 for transmission to the CF tier 102 via the private network 194. The television content is further encoded at the data server 132, and sent to the client equipment 110 and 120 via the access network 192. The set-top box devices 114 and 124 receive the television content from the modems 112 and 122, decode the television content, and transmit the content to the display devices 116 and 126 according to commands from the remote control devices 118 and 128.

Additionally, the VoD importer server 156 receives content from one or more video-on-demand sources that can be outside the IPTV system 100, such as movie studios and programmers of non-live content. The VoD importer server 156 transmits the video-on-demand content to the AQT switch 150, and the AQT switch 150 communicates the material to the CFT switch 130 via the private network 194. The VoD content is stored on the VoD server 136. When a subscriber issues a request for VoD content to the set-top box device 114 or 124 through the remote control 118 or 128, the request is transmitted over the access network 192 to the VoD server 136 via the CFT switch 130. Upon receiving such a request, the VoD server 136 can retrieve requested VoD content and transmit the content to the set-top box device 114 or 124 across the access network 192 via the CFT switch 130.

The OM tier 108 includes an OM tier (OMT) switch 160, a TV2 server 162, the OSS/BSS server 164, and a simple network management protocol (SNMP) monitor server 166. The OMT switch 160 manages the communication between the OM tier 108 and the public network 196. The OMT switch 160 is coupled to the TV2 server 162, the OSS/BSS server 164, and the SNMP monitor server 166 that monitors network devices. The TV2 server 162 receives television content from the live acquisition server 152, or VoD content from the VoD importer server 156 through the public network 196. The TV2 server 162 can send the television and VoD content to the OMT switch 160 and forwarded to a subscriber of the IPTV system 100 who accesses the public network 196 through the personal computer 198.

The IPTV system 100 can include a commute and travel planning application 143. The commute and travel planning application 143 provides a personalized traffic channel for subscribers to the IPTV system 100. When a subscriber tunes the set-top box 116 to the traffic channel, the subscriber can be presented with menu selections to create a personalized travel route profile, select traffic cameras to associate with the travel route profile, and request traffic alerts for the travel route profile. The subscriber can then make menu selections to view the route, the associated traffic cameras and any traffic alerts for the travel route profile. The subscriber can also link their travel route profiles with their wireless device 176 to receive traffic camera images from the traffic cameras along the route, and traffic alerts while on the route. When the wireless device 176 is enabled with a global positioning system (GPS) or another cellular locating system, the traffic camera images and traffic alerts can be received for the particular location where the wireless device 176 is located. The commute and travel planning application 143 can be implemented as a single program, or as separate programs carrying out the various features as described below. In a non-limiting example, the commute and travel planning application 143 is illustrated in FIG. 1 as residing in the application tier 104 on the application server 142.

FIGS. 2-8 illustrate screens depicted on the display device 126 of an embodiment of the commute and travel planning application 143. In each case, content information can be sent by the application server 142 to the CF tier 102, where the data server 132 can format the information into a form suitable for transmission to the set-top box 124 for display on the display device 126. In the alternative, the application server 142 can format the information in a form suitable for transmission to the set-top box 124, and send it to the CFT switch 130 to be forwarded to the set-top box 124. The subscriber can interact via the remote control 128 with the set-top box 124 to provide information back to the application server 142, and thus perform the actions described below. In each case, the elements depicted on the screens are illustrative of features of the commute and travel planning application 143, and are not meant to limit the content that may be displayed on the display device 126. For example, the information contained in the screens may be shown alone, or in combination with other information such as advertisements, other news or weather information, a picture-in-picture display, etc.

Figure 2:
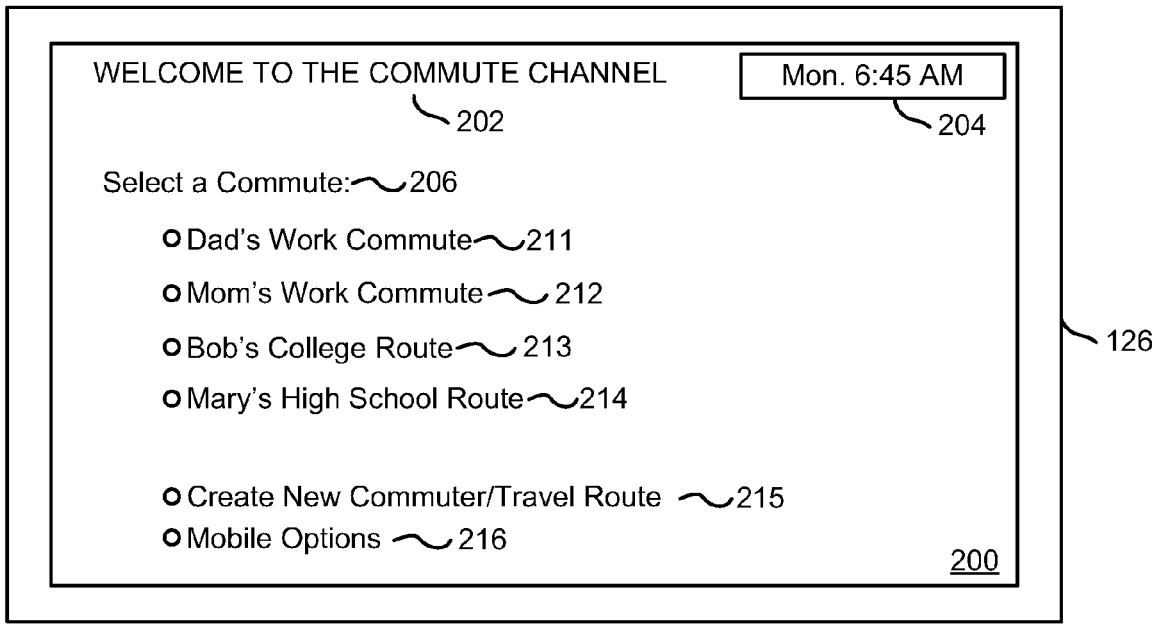
FIG. 2 illustrates an embodiment of a traffic channel welcome screen on a display.

FIG. 2 illustrates an embodiment of a traffic channel welcome screen 200 depicted on the display device 126. The traffic channel welcome screen 200 includes a welcome banner 202, a time banner 204, a route selection banner 206, several travel route selections 211, 212, 213, and 214, a new travel route selection 215, and a mobile options selection 216. The welcome banner 202 identifies the selected channel as the traffic channel. The time banner 204 identifies the current time of day, and can include day and date information. The selection banner 206 prompts the subscriber to select from the list of selections 211 through 216. The travel route selections 211, 212, 213, and 214 direct the commute and travel planning application 143 to display travel route profiles that already exist on the commute and travel planning application 143. The travel route selections 211, 212, 213, and 214 can exist because the subscriber previously created travel route profiles, or they can be supplied by the commute and travel planning application 143. Travel route selections supplied by the commute and travel planning application 143 can include travel route profiles that are deemed to be popular by the IPTV system 100 provider based upon the subscriber's location, or can be promotional in nature. The new travel route selection 215 directs the commute and travel planning application 143 to create a new travel route profile. The mobile options selection 216 permits the subscriber to customize the traffic channel and set up the links with the wireless device 176.

Figure 3:
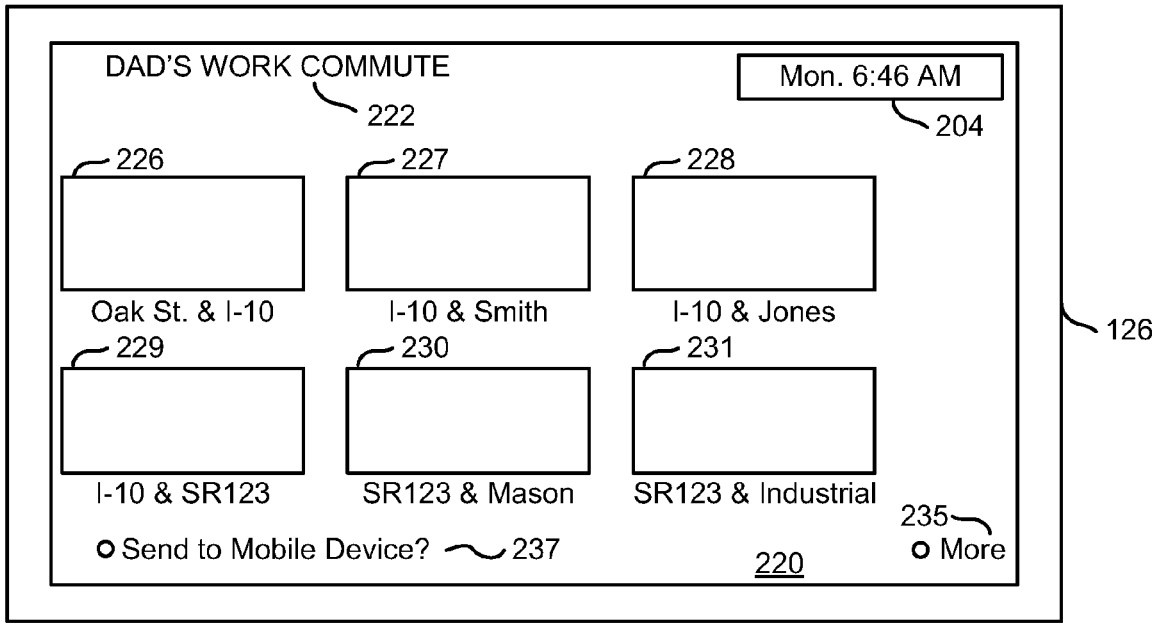
FIG. 3 illustrates an embodiment of a travel route screen on a display device.

FIG. 3 illustrates an embodiment of a travel route screen 220 depicted on the display device 126. As illustrated, the subscriber will have selected the travel route selection 211, labeled "Dad's Work Commute" in the traffic channel welcome screen 200. The travel route screen 220 includes a route identification banner 222, the time banner 204, several traffic camera windows 226, 227, 228, 229, 230, and 231, a page selector 235, and a mobile device selection 237. The route identification banner 222 identifies the travel route profile selected, i.e., "Dad's Work Commute." The traffic camera windows 226, 227, 228, 229, 230, and 231 show images from various traffic cameras associated with the selected travel route profile. The traffic cameras are typically operated and maintained by entities other than the IPTV system 100 provider such as state transportation departments, highway patrols, etc. The images from such traffic cameras are typically available over the public network 196 such as the Internet, through a broadcast service 154, through proprietary broadcast services, or any combination thereof. The page selector 235 permits the subscriber to access additional travel route screens (not illustrated) that contain additional traffic camera windows for additional points associated with the travel route profile. The page selector 235, as illustrated, indicates that additional traffic cameras are available to be viewed. In another embodiment (not illustrated), the page selector 235 can be used to scroll forward and backward through the travel route screen 220. Likewise, the page selector can be a scrollbar, a thumbwheel on a mouse, another page selecting device, or any combination thereof. In another embodiment (not illustrated), the travel route screen 220 can include a map of the route, an estimated time to travel the route, traffic alerts for locations along the route, other traffic related information, or any combination thereof. The mobile device selection 237 will be described below.

When the subscriber wishes to view the traffic cameras associated with a particular travel route profile, the subscriber selects the appropriate travel route selection 211, 212, 213, or 214 via the remote control 128. The selection is sent to the commute and travel planning application 143, which recalls the travel route profile associated with the selected travel route selection 211, 212, 213, or 214, determines which traffic cameras are associated with the selected travel route profile, and accesses the images from the traffic cameras. The commute and travel planning application 143 compiles the traffic camera images into a mosaic, and sends the mosaic to the set-top box 124 to be displayed as the travel route screen 220 on the display 126. In the alternative, the commute and travel planning application 143 can send the individual images to set-top box 124, where the set-top box program 125 can compile the images into a mosaic to be displayed as the travel route screen 220 on the display 126.

Figure 4:
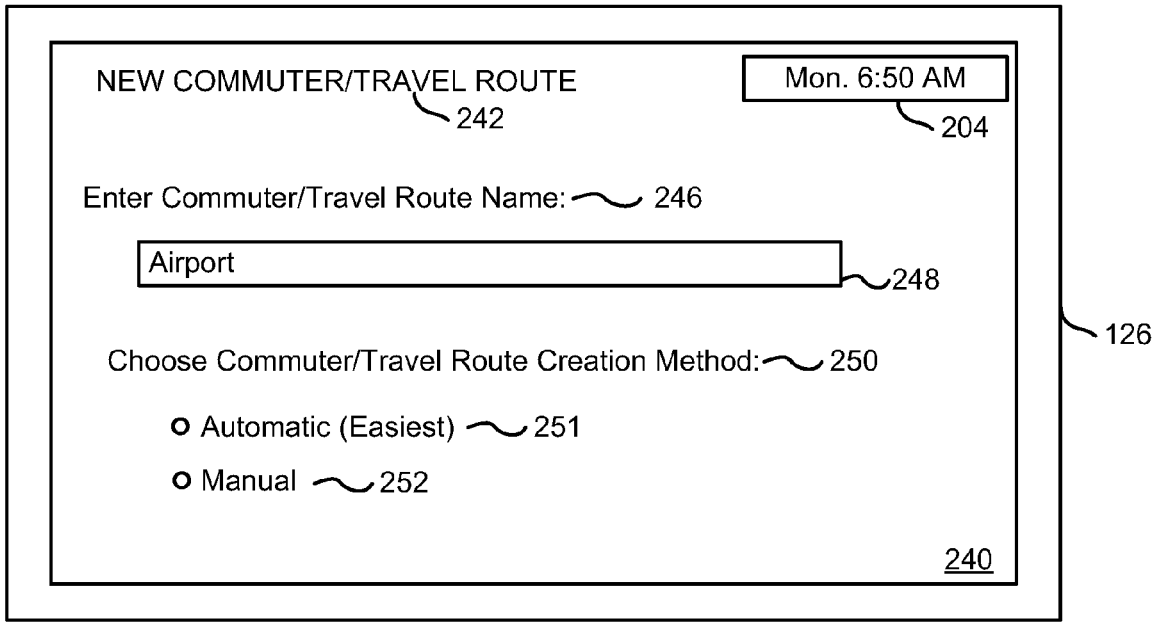
FIG. 4 illustrates an embodiment of a new travel route screen on a display.

When the subscriber wishes to create a new travel route profile, the subscriber selects the new travel route selection 215, labeled "Create New Commuter/Travel Planning Route" in the traffic channel welcome screen 200, and the information is sent to the commute and travel planning application 143. The commute and travel planning application 143 returns a new travel route screen to the set-top box 124 to be displayed as a travel route screen on the display 126. FIG. 4 illustrates an embodiment of a new travel route screen 240. The new travel route screen 240 includes a route creation banner 242, the time banner 204, a route name banner 246, a route name selection box 248, a creation method selection banner 250, and creation method selections 251 and 252. The subscriber enters a name for a new travel route profile into the route name selection box 248. The subscriber can select an automatic route creation method 251, labeled "Automatic (Easiest)" in the new travel route screen 240, or a manual entry route creation method 252, labeled "Manual Entry" in the new travel route screen 240.

Figure 5:
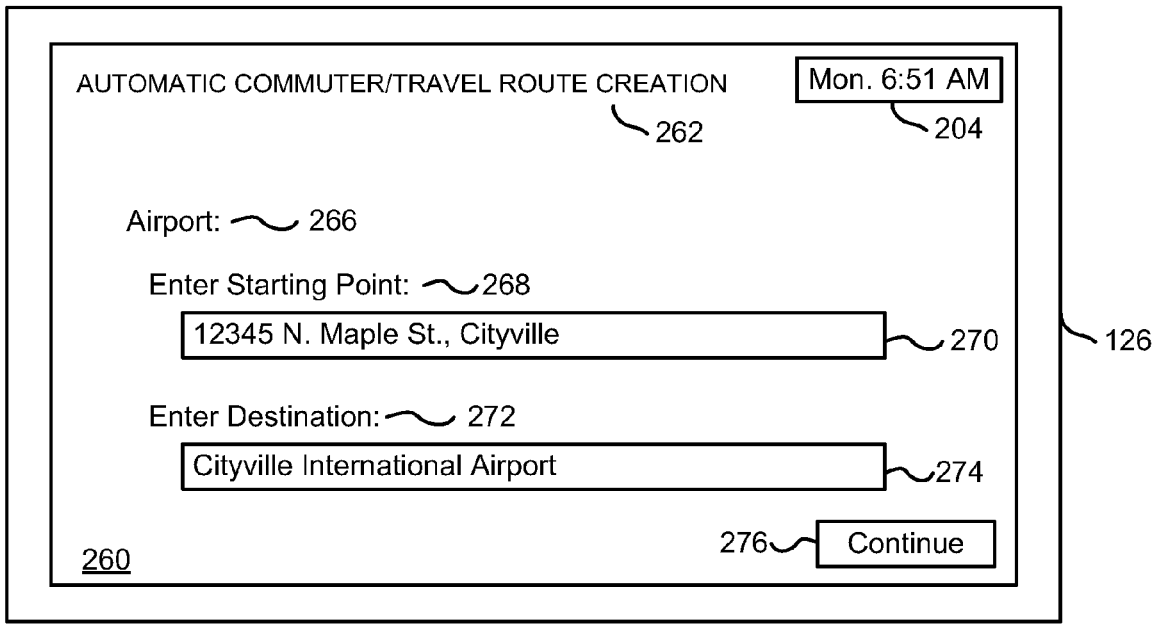
FIG. 5 illustrates an embodiment of an automatic route entry screen on a display.

FIG. 5 illustrates an embodiment of an automatic route entry screen 260 depicted on the display device 126. The automatic route entry screen 260 includes an automatic route creation banner 262, the time banner 204, a route name banner 266, a starting point banner 268, a starting point selection box 270, a destination banner 272, a destination selection box 274, and a continue button 276. The route name banner 266 lists the name of the new travel route profile as entered into the route name selection box 248, e.g., "Airport." The subscriber enters a starting point for the new travel route profile into the starting point selection box 270, enters the destination for the new travel route profile into the destination selection box 274, and indicates that the entries are completed by selecting the continue button 276.

When the subscriber selects the continue button 272, the commute and travel planning application 143 determines a travel route that joins the starting point listed in the starting point selection box 270 with the destination listed in the destination selection box 274. It will be appreciated that determining the travel route can be implemented on the application server, or over the public network 196, utilizing a personalized web mapping and routing service, or route optimizer, such as MapQuest®, Google™ Maps, etc. The commute and travel planning application 143 also searches the public network 196 to find traffic cameras that broadcast imagery for locations along the travel route, and sends them to the set-top box 124 for display on the display device 126.

Figure 6:
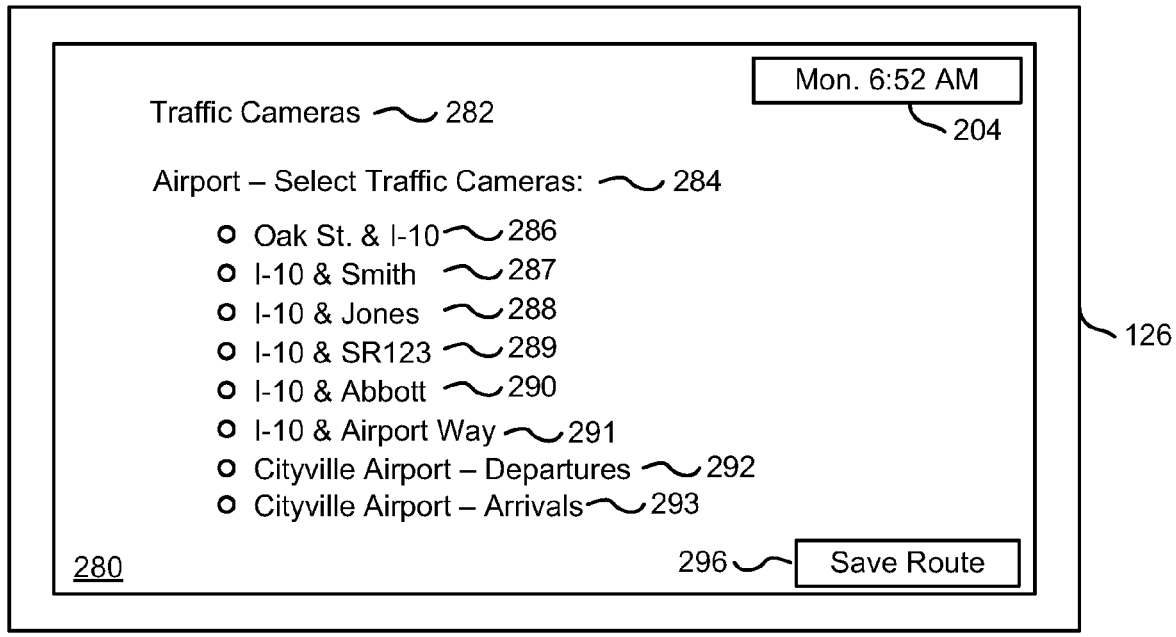
FIG. 6 illustrates an embodiment of a traffic camera selection screen on a display.

FIG. 6 illustrates an embodiment of a traffic camera selection screen 280 depicted on the display device 126. The traffic camera selection screen 280 includes a traffic camera banner 282, the time banner 204, a camera selection banner 282, several traffic camera selections 286, 287, 288, 289, 290, 291, 292, and 293, and a save route button 296. The traffic camera selections 286 through 293 include the traffic cameras that broadcast imagery for locations along the travel route found by the commute and travel planning application 143. In an embodiment, the traffic camera selection screen also includes a map (not illustrated) showing the starting point, the destination and the travel route. The subscriber may select which traffic camera selections 286 through 293 to associate with the travel route, and indicate that the selection is complete by selecting the save route button 296. The selected traffic camera selections 286 through 293 are communicated to the commute and travel planning application 143, which creates a travel route profile that associates the selected traffic camera selections 286 through 293 with the travel route, and saves the new travel route profile with the subscriber's other travel route profiles. Thereafter, when the subscriber selects the traffic channel, a new traffic channel welcome screen (not illustrated) includes the several travel route selections 211, 212, 213, and 214, and a new travel route selection for the new travel route profile, e.g., a travel route selection labeled "Airport."

Figure 7:
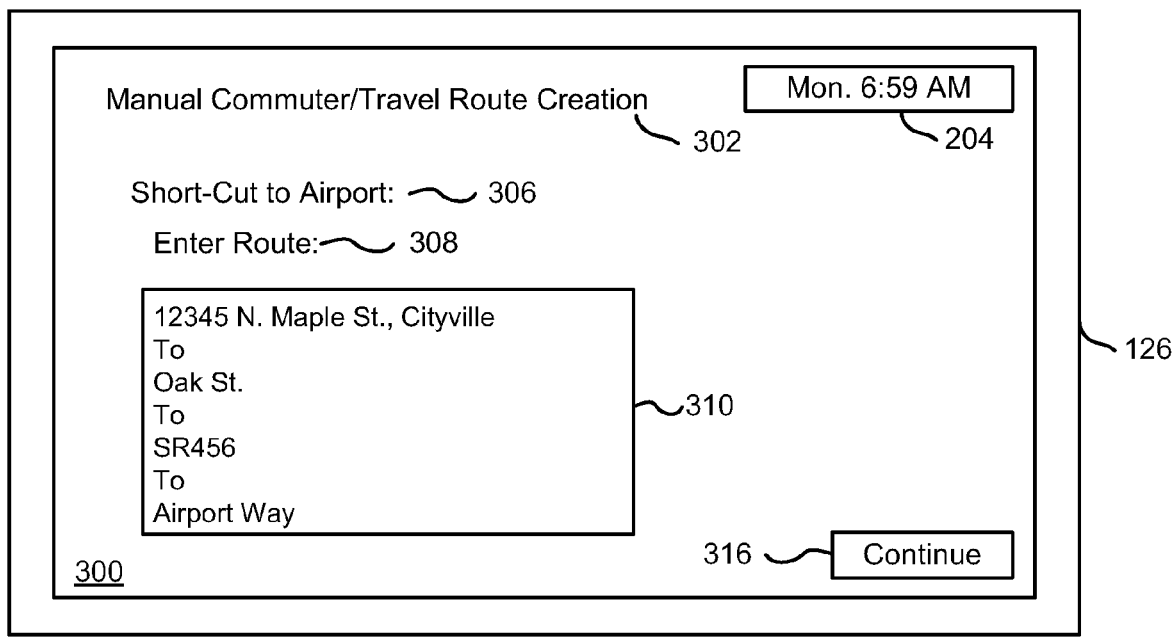
FIG. 7 illustrates an embodiment of a manual route entry screen on a display.

FIG. 7 illustrates an embodiment of a manual route entry screen 300 depicted on the display device 126. The manual route entry screen 300 includes a manual route creation banner 302, the time banner 204, a route name banner 306, a route entry banner 308, a route entry box 310, and a continue button 316. The route name banner 306 lists the name of the new route profile as entered into the route name selection box 248, e.g., "Airport." The subscriber enters a list of route identifiers such as addresses, street names, intersections, etc., into the route entry box 310, and indicates that the entry is completed by selecting the continue button 316.

When the subscriber selects the continue button 316, the commute and travel planning application 143 can search the public network 196 to find traffic cameras that broadcast imagery for locations along the travel route listed in the route entry box 310, and send them to the set-top box 124 for display on the display device 126. The subscriber can be presented with a traffic camera selection screen (not illustrated), similar to the traffic camera selection screen 300, where the traffic camera selections include the traffic cameras that broadcast imagery for locations along the travel route listed in the route entry box 310. Again, the subscriber may select which traffic camera selections to associate with the travel route. The selected traffic camera selections are communicated to the commute and travel planning application 143, which creates a travel route profile that associates the selected traffic camera selections with the travel route, and saves the new travel route profile with the subscriber's other travel route profiles. As described above, thereafter, the traffic channel welcome screen (not illustrated) includes a new travel route selection for the new travel route profile, e.g., a travel route selection labeled "Short-Cut to Airport."

Figure 8:
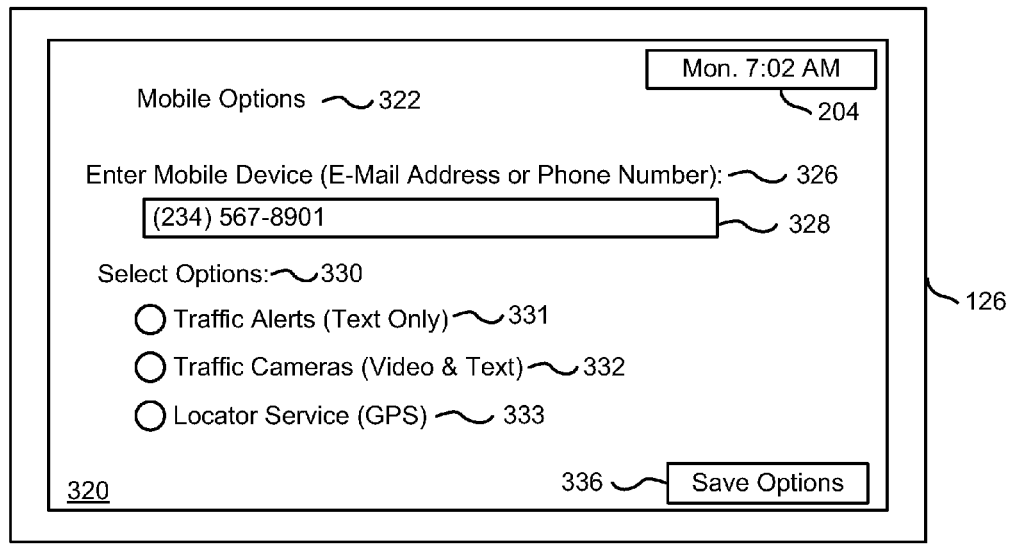
FIG. 8 illustrates an embodiment of a mobile options screen on a display.

When the subscriber wishes to link their travel route profiles with their wireless device 176 to receive traffic camera images from the traffic cameras along a route, and traffic alerts while on the route, the subscriber selects the mobile options selection 216 in the traffic channel welcome screen 200, and the information is sent to the commute and travel planning application 143. The commute and travel planning application 143 returns a mobile options screen to the set-top box 124 to be displayed on the display 126. FIG. 8 illustrates an embodiment of a mobile options screen 320. The mobile options screen 320 includes a mobile options banner 322, the time banner 204, a route name banner 246, a mobile device identity banner 326, a mobile device identity selection box 328, a option selection banner 330, option selections 331, 332, and 333, and a save options button 336. The subscriber enters identifying information for their wireless device 176 into the mobile device identity selection box 328. The identifying information can include a cellular telephone number, an e-mail address, another form of identification that uniquely identifies the subscriber's wireless device 176, or any combination thereof. The subscriber can choose whether to receive traffic alerts only, such as via text messaging, or to receive both the traffic camera images and the traffic alerts. To receive only the traffic alerts, the subscriber selects the traffic alert option selection 331, labeled "Traffic Alerts (Text Only) ." To receive both the traffic camera images and the traffic alerts, the subscriber selects the traffic camera option selection 332, labeled "Traffic Cameras (Video & Text)." The subscriber can indicate that option selection is complete by selecting the save options button 336. It will be appreciated that other mobile options (not illustrated) may be implemented on the mobile options screen 320, depending on the particular wireless device 176 used.

Figure 9:
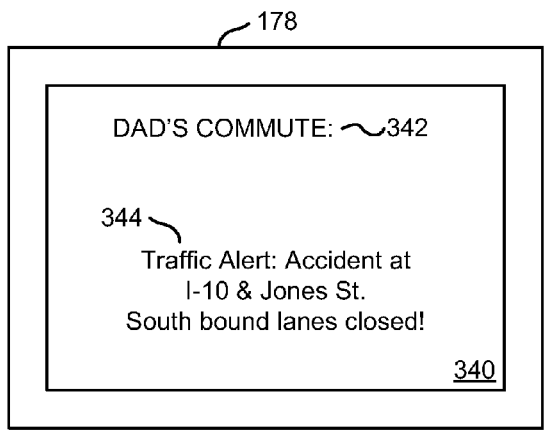
FIG. 9 illustrates an embodiment of a text screen on a wireless device.

When the subscriber wishes to receive traffic alerts or traffic camera images from traffic cameras along a route on their wireless device 176, the subscriber selects the appropriate travel route selection 211, 212, 213, or 214 on the traffic channel welcome screen 200, and then selects the mobile device selection 237, labeled "Send to Mobile Device?" on the travel route screen 220. The commute and travel planning application 143 recalls the travel route profile associated with the selected travel route selection 211, 212, 213, or 214. If the subscriber previously selected to receive only the traffic alerts by selecting the traffic alert option selection 331, then the commute and travel planning application 143 monitors the public network 196 for traffic alerts associated with the selected travel route selection 211, 212, 213, or 214. Traffic alerts associated with the route are sent by the commute and travel planning application 143 to the domain controller 146 to be communicated to the subscriber's wireless device 176 as a text message. The traffic alert is displayed on the wireless device display 178. FIG. 9 illustrates an embodiment of a text screen 340 on the wireless device display 178 that includes a route identification banner 342 and a text alert 344. The route identification banner 342 identifies the travel route selection 211, 212, 213, or 214 selected by the subscriber. The text alert 344 includes the traffic alert information for traffic alerts associated with the selected route.

Figure 10:
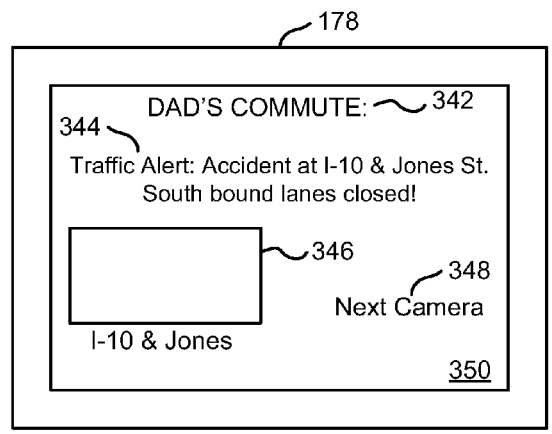
FIG. 10 illustrates an embodiment of an image display on a wireless device.

If the subscriber previously selected to receive the traffic alerts and the traffic camera images by selecting the traffic camera option selection 332, then the commute and travel planning application 143 monitors the public network 196 for traffic alerts, and accesses the images from the traffic cameras associated with the selected travel route selection 211, 212, 213, or 214. Traffic alerts and traffic camera images associated with the route are sent by the commute and travel planning application 143 to the domain controller 146 to be communicated to the subscriber's wireless device 176 as a image display. The image display is displayed on the wireless device display 178. FIG. 10 illustrates an embodiment of an image screen 350 depicted on the wireless device display 178. The image screen 350 includes the route identification banner 342, the text alert 344, a traffic camera window 346, and a next camera selection 348. The traffic camera window 346 displays the traffic camera image from one of the traffic cameras associated with the selected travel route 211, 212, 213, or 214.

Typically, the first traffic camera image will be displayed first. When the subscriber moves further along the route, the subscriber can request that the commute and travel planning application 143 send the next traffic camera image by selecting the next camera selection 348. The commute and travel planning application 143 will then send the next traffic camera image to the domain controller for display in the traffic camera window 346. It will be appreciated that more than one traffic camera image may be displayed on the wireless device display 178, and that the size of the traffic camera image may need to be reduced to accommodate more than one traffic camera image on the image screen 350. Thus, in an alternative embodiment (not illustrated), the image screen 350 can include a small version, such as a thumbnail image, of multiple traffic camera images, and the subscriber can select from among the thumbnail images, whereupon the commute and travel planning application 143 will send the selected traffic camera image for display in the traffic camera window 346.

When the subscriber's wireless device 176 is enabled with a GPS or another cellular locating system, the subscriber can choose to receive the traffic alerts or traffic camera images for the particular location where the wireless device 176 is located by selecting the locator service option selection 333, labeled "Locator Service (GPS)" in the mobile options screen 320. In this case, the locating system in the wireless device 176 can inform the commute and travel planning application 143 of the current location of the wireless device 176. The commute and travel planning application 143 monitors the public network 196 for traffic alerts and traffic cameras associated with the current location and sends the traffic alerts and traffic camera images to the domain controller 146 to be communicated to the subscriber's wireless device 176.

Figure 11:
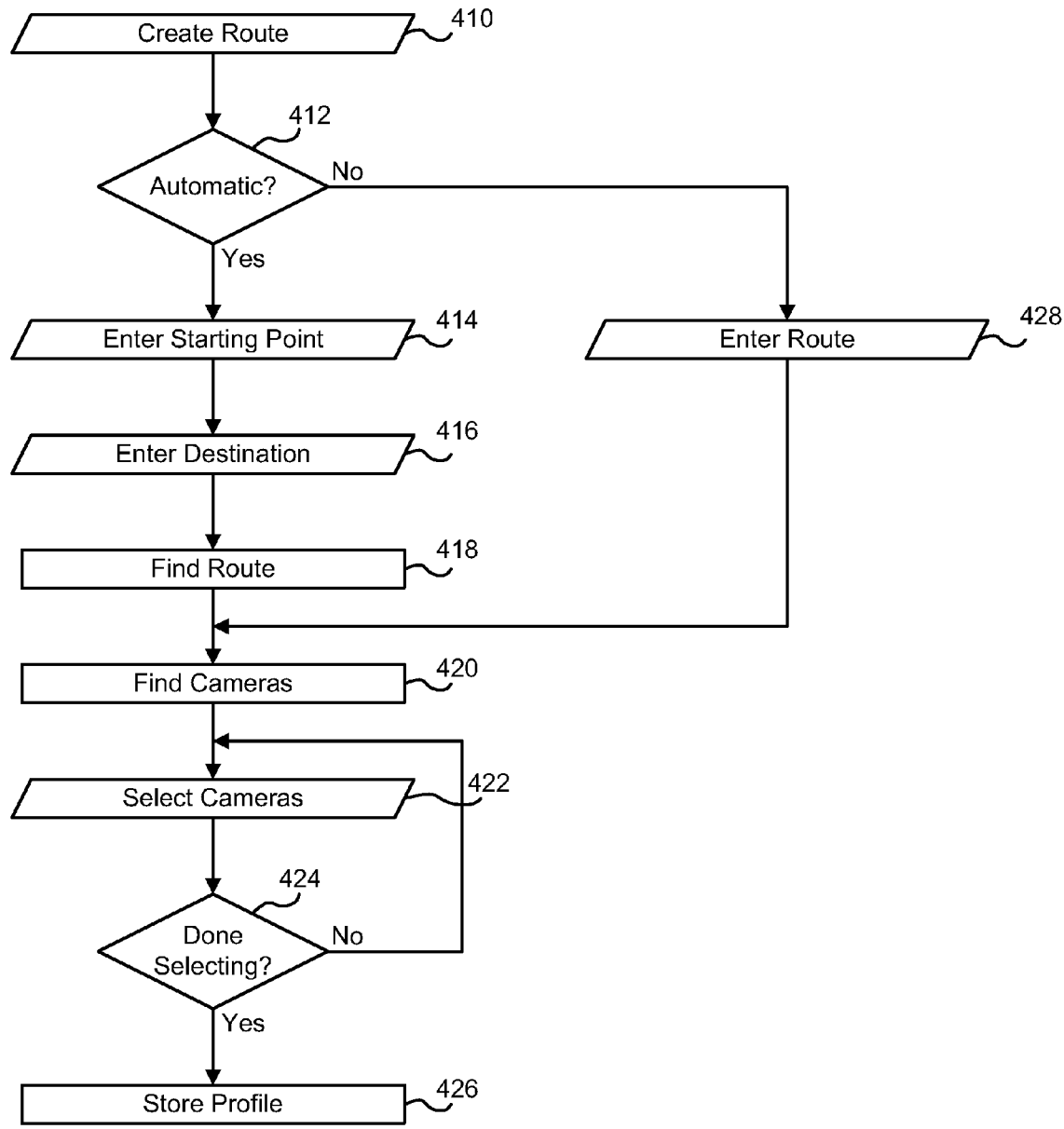
FIG. 11 is a flow chart illustrating an embodiment of a method of creating a travel route profile on an IPTV system.

FIG. 11 illustrates an embodiment of a method of creating a travel route profile on an IPTV system 100 in a flow chart form. A subscriber to the IPTV system 100 can choose to create a new travel route profile in block 410. A decision is made whether the route should be created automatically by the IPTV system 100, or if the subscriber should enter the route information in decision tree 412. If the IPTV system 100 is not to create the route automatically, then the subscriber enters the route in block 428. If the IPTV system 100 is to create the route automatically, then the subscriber enters a starting point for the route in block 414, and enters a destination for the route in block 416. The IPTV system 100 creates the route based upon the starting point and the destination in block 418. The IPTV system 100 takes the route created in block 418, or the route entered by the subscriber in block 428 and finds traffic cameras associated with the route and displays the cameras to the subscriber in block 420. The subscriber selects a traffic camera from among the displayed traffic cameras in block 422. A decision is made whether the subscriber is done selecting traffic cameras in decision tree 424. If not, then the subscriber selects another traffic camera in block 420. If the subscriber is done selecting traffic cameras, then a route profile is stored in the IPTV system that associates the selected traffic cameras with the route.

Figure 12:
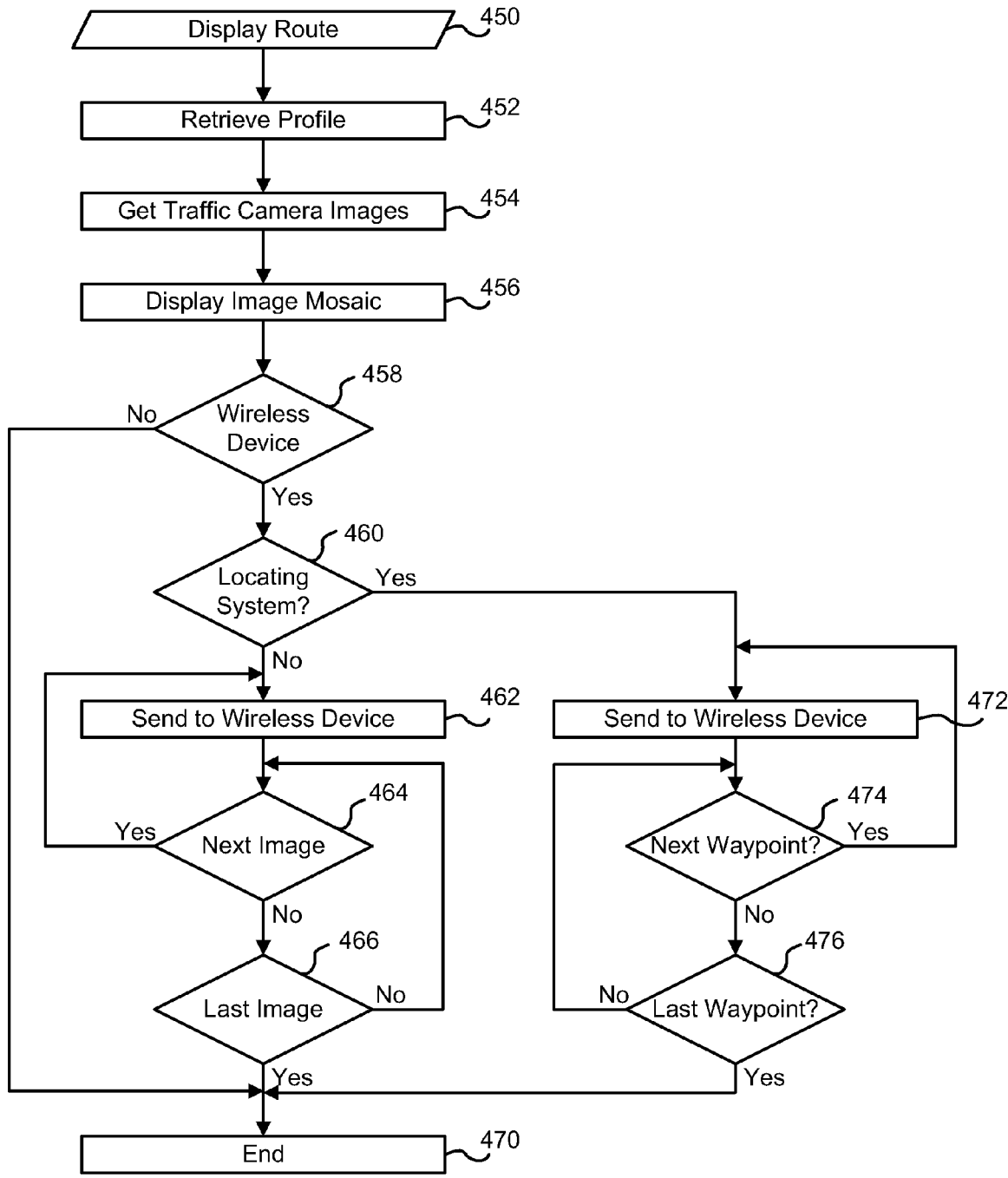
FIG. 12 is a flow chart illustrating an embodiment of a method of displaying a travel route profile on an IPTV system.

FIG. 12 illustrates an embodiment of a method of displaying a travel route profile on an IPTV system 100 in a flow chart form. A subscriber to the IPTV system 100 can choose to display a travel route profile in block 450. The IPTV system 100 retrieves the rout profile in block 452, gets the traffic camera images associated with the route profile from the public network 196 in block 454, and composes the traffic camera images into a mosaic for display on the subscriber's display device 116 or 126 in block 456. A decision is made whether to send the traffic camera images associated with the route profile to the subscriber's wireless device 176 in decision tree 458. If not, then processing ends at block 470. If so, then a decision is made whether to use a locating system in the subscriber's wireless device 176 in decision tree 460. If not, then the IPTV system 100 sends the first traffic camera image to the wireless device 176 in block 462. A decision is made whether or not the subscriber has requested the next traffic camera image in decision tree 464. If so, then the IPTV system 100 sends the next traffic camera image in block 462. If the subscriber has not requested the next traffic camera image, then a decision is made whether the image currently being displayed is the last image in decision tree 466. If not, then processing returns to decision tree 464. If so, then processing ends at block 470.

If a decision is made to use a locating system in the subscriber's wireless device 176 in decision tree 460, then the IPTV system 100 sends the first traffic camera image to the wireless device 176 in block 472. A decision is made whether or not the subscriber's wireless device is close to the location covered by the next traffic camera image in decision tree 474. If so, then the IPTV system 100 sends the next traffic camera image in block 472. If the subscriber's wireless device is not close to the location covered by the next traffic camera image, then a decision is made whether the image currently being displayed is the last image in decision tree 476. If not, then processing returns to decision tree 474. If so, then processing ends at block 470.

Figure 13:
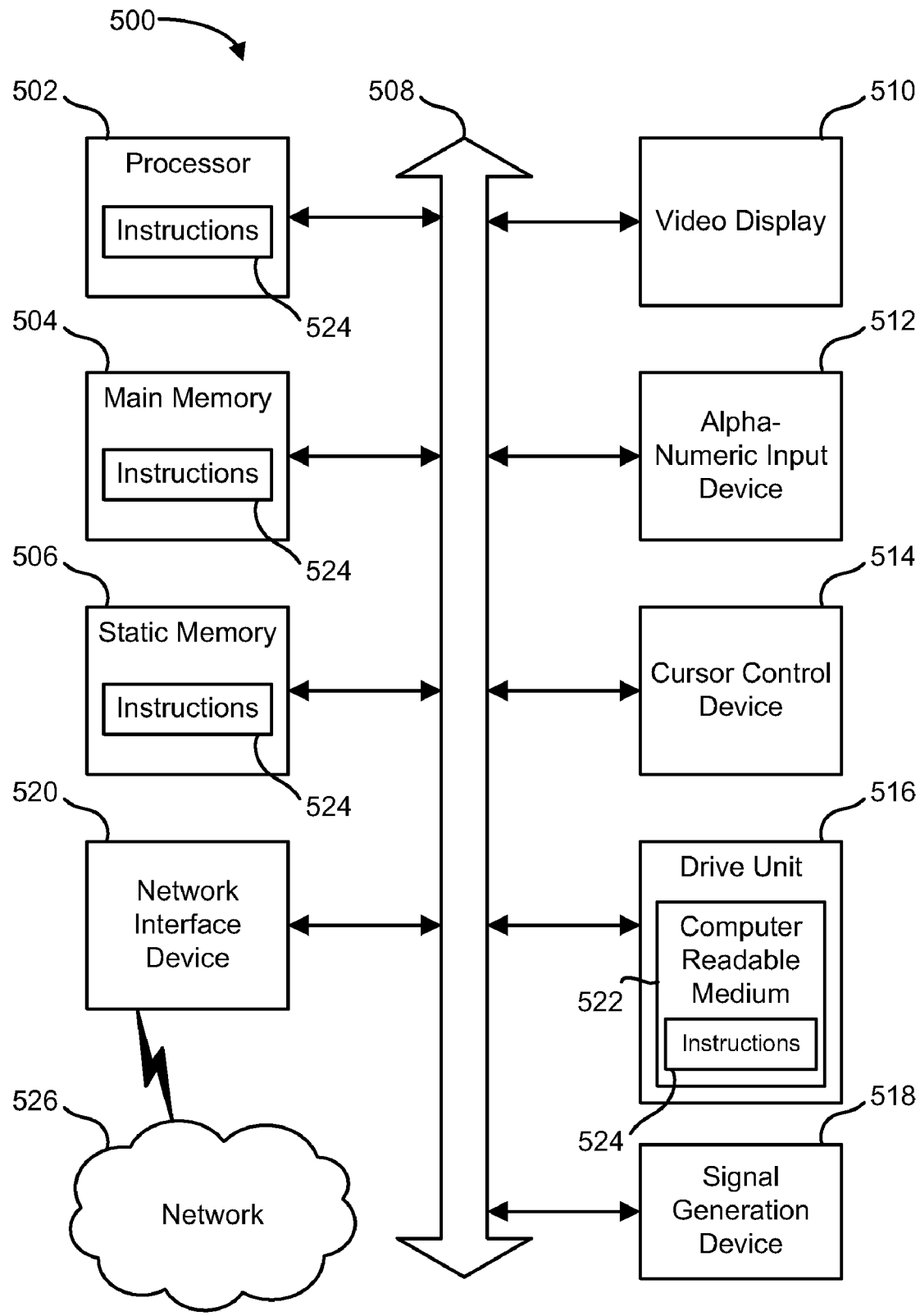
FIG. 13 is a block diagram illustrating a general purpose computer system.

FIG. 13 shows an illustrative embodiment of a general computer system 500 in accordance with at least one embodiment of the present disclosure. The computer system 500 can include a set of instructions that can be executed to cause the computer system 500 to perform any one or more of the methods or computer based functions disclosed herein. The computer system 500 may operate as a standalone device or may be connected via a network to other computer systems or peripheral devices.

In a networked deployment, the computer system may operate in the capacity of a server or as a client computer in a server-client network environment, or as a peer computer system in a peer-to-peer (or distributed) network environment. The computer system 500 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502 such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524 can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media. The network interface device 520 can provide connectivity to a network 526 such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A server comprising:
   a memory; and
   a processor coupled to the memory, wherein the memory comprises computer instructions, which when executed by the processor cause the processor to:
   deliver an Internet Protocol Television stream to a set-top box in an Internet Protocol Televisions system;
   retrieve a first image from a first traffic camera associated with a route profile stored in the Internet Protocol Television system and linked to a wireless device;
   retrieve one or more additional images corresponding to traffic images specified by the route profile;
   compile the first image and the one or more additional images into a mosaic of traffic images; and
   send the mosaic of traffic images to the set top box.

2. The server of claim 1 wherein the processor is further operable to:
   receive a first request from the set top box to send the first image to the wireless device having a locator service;
   responsive to receiving the first request, send the first image from the first traffic camera to the wireless device via the Internet protocol television system;
   receive a second request from the set-top box to retrieve a second image from a second traffic camera associated with the route profile stored in the Internet Protocol Television system;
   retrieve the second image from the second traffic camera;
   receive a second request from the wireless device to send the second image to the wireless device; and
   send the second image to the wireless device.

3. The server of claim 2 wherein the processor is further operable to:
   create the route profile that associates the first traffic camera with the second traffic camera.

4. The server of claim 2 wherein the second request is based upon the location of the wireless device.

5. The server of claim 2 wherein the processor is further operable to:
   combine the first image and the second image into a third image; and
   send the third image to the wireless device.

6. A method comprising:
   delivering an Internet protocol television stream to a set-top box in an Internet protocol television system;
   retrieving a first image from a first traffic camera associated with a route profile stored in the Internet Protocol Television system;
   retrieving one or more additional images corresponding to traffic images specified by the route profile;
   receiving a first request from the set-top box to send the first image and the one or more additional images to a wireless device via a wireless network; and
   responsive to receiving the first request, sending the first image and the one or more additional images to the wireless device as a mosaic of traffic images via the wireless network.

7. The method of claim 6 further comprising:
   receiving a second request from the set-top box to retrieve a second image from a second traffic camera associated with the route profile stored in the Internet Protocol Television system;
   retrieving the second image from the second traffic camera;
   receiving a second request from the wireless device to send the second image to the wireless device; and
   sending the second image to the wireless device.

8. The method of claim 7 further comprising:
   creating the route profile that associates the first traffic camera with the second traffic camera.

9. The method of claim 7 wherein the second request is based upon the location of the wireless device.

10. The method of claim 7 further comprising:
combining the first image and the second image into a third image; and
sending the third image to the wireless device.

11. A non-transitory machine-executable code embedded within a tangible medium, and including instructions that, when executed by one or more processors, cause the one or more processors to:
deliver an Internet Protocol Television stream to a set-top box in an Internet Protocol Television system;
retrieve a first image from a first traffic camera associated with a route profile stored in the Internet Protocol Television system;
retrieve one or more additional images corresponding to traffic images specified by the route profile;
receive a first request from the set-top box to send the first image to a wireless device;
responsive to receiving the first request, send the first image to the wireless device;
compile the first image and the one or more additional images into a mosaic of traffic images; and
sending the mosaic of traffic images to the set top box.

12. The non-transitory machine-executable code of claim 11 further comprising instructions that cause the one or more processors to:
receive a second request from the set-top box to retrieve a second image from a second traffic camera associated with the route profile stored in the Internet Protocol Television system;
retrieve the second image from the second traffic camera;
receive a second request from the wireless device to send the second image to the wireless device; and
send the second image to the wireless device.

13. The non-transitory machine-executable code of claim 12 further comprising instructions that cause the one or more processors to:
create the route profile that associates the first traffic camera with the second traffic camera.

14. The non-transitory machine-executable code of claim 12 wherein the second request is based upon the location of the wireless device.

15. The non-transitory machine-executable code of claim 12 further comprising instructions that cause the one or more processors to:
combine the first image and the second image into a third image; and
send the third image to the wireless device.

16. A set-top box for communicating with a server and with a wireless device, the set-top box comprising:
a memory; and
a processor coupled to the memory having computer instructions stored therein causing the processor to:
receive an Internet Protocol television stream in an Internet Protocol Television system;
retrieve a first image from a first traffic camera associated with a route profile stored in the Internet Protocol Television system;
retrieve one or more additional images from corresponding additional traffic cameras;
compile at the set top box the first image and the one or more additional images into a mosaic of traffic images; and
send the mosaic of traffic images to the wireless device in response to a first request entered in a graphical user interface of the set top box.

17. The set-top box of claim 16 wherein the processor is further adapted to:
receive a second request to retrieve a second image from a second traffic camera associated with the route profile stored in the Internet Protocol Television system;
retrieve the second image from the second traffic camera;
send the mosaic of traffic images comprising the first and second images to the wireless device.

18. The set-top box of claim 17 wherein the processor is further adapted to:
create the route profile that associates the first traffic camera with the second traffic camera.

19. The set-top box of claim 17 wherein the third request is based upon the location of the wireless device.

20. The set-top box of claim 17 wherein the processor is further adapted to:
combine the first image and the second image into a third image; and
send the third image to the wireless device.

* * * * *